Sept. 30, 1958     L. L. ASPELIN     2,853,948
LUBRICATING AND COOLING ARRANGEMENT
FOR A BEARING ASSEMBLY
Filed Aug. 19, 1955
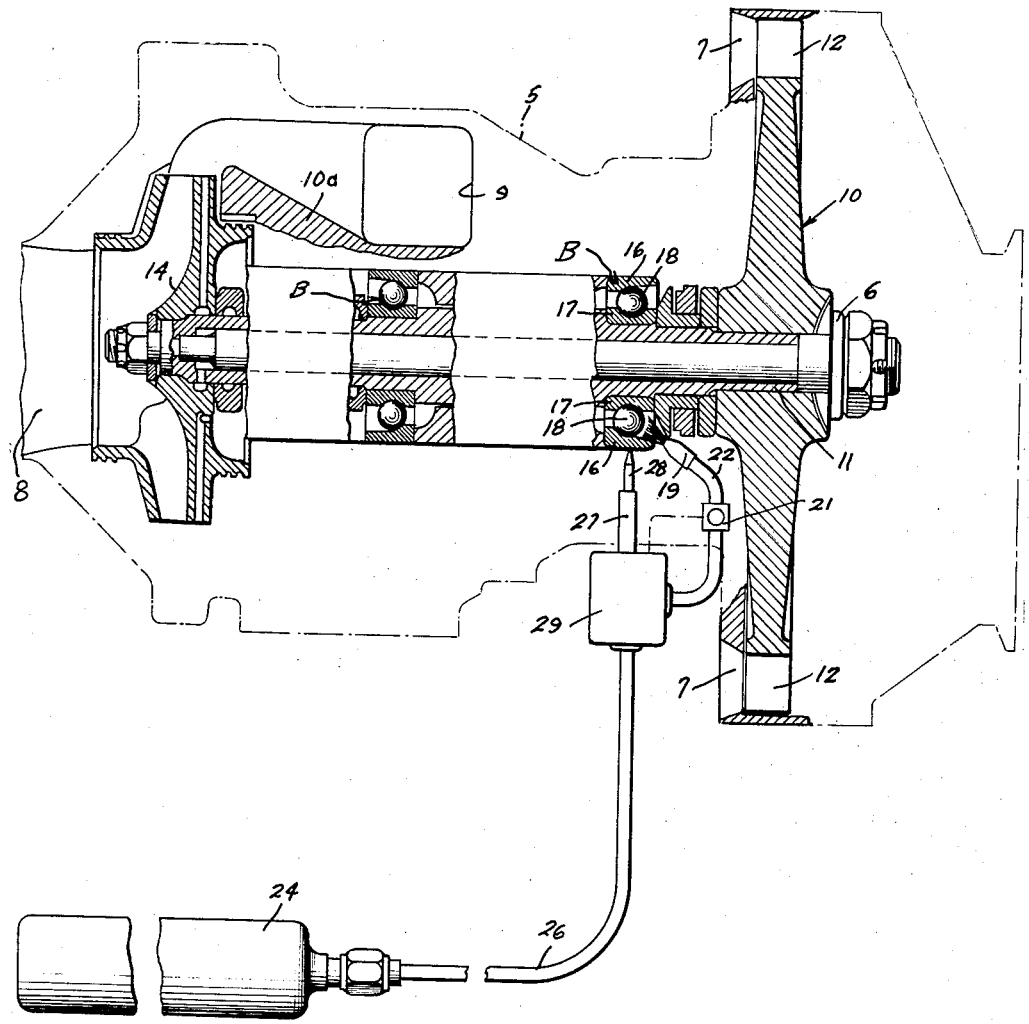
Inventor
LESLIE L. ASPELIN
by
Attys.

United States Patent Office 2,853,948
Patented Sept. 30, 1958

2,853,948

LUBRICATING AND COOLING ARRANGEMENT FOR A BEARING ASSEMBLY

Leslie L. Aspelin, Cleveland Heights, Ohio, assignor to Thompson Products, Inc., Cleveland, Ohio, a corporation of Ohio Application August 19, 1955, Serial No. 529,381

1 Claim. (Cl. 103—87)

The present invention deals with improvements in lubrication systems for bearings and the like and has particular applicability to the lubrication of bearing assemblies under extreme conditions of high speed and high temperature operation.

Ordinary problems of lubrication are intensified immensely under conditions existing in jet engines, rockets, guided missiles, and similar high speed devices. The velocities achieved by the mechanical elements in such assemblies accentuate problems of preventing wear by the relative movement between one metallic element and another.

At conditions of extremely high velocity, the friction created between a shaft, for example, and its bearings may raise the temperature of the bearing assembly to such a high value that the bearing will not accept a lubricant, since at the temperatures involved, the lubricant is for the most part vaporized. The inability to lubricate properly, of course, further increases the frictional wear and thereby further increases the temperature, progressively degenerating the entire operating environment.

With the foregoing in mind, an object of the present invention is to provide an improved lubrication system for bearings and the like, particularly where employed in high velocity, high temperature environments.

Still another object of the invention is to provide an improved lubrication system particularly adaptable for bearing assemblies in guided missiles, jet engines, and similar high speed assemblies.

A further object of the invention is to provide an improved method for lubricating a bearing or the like while simultaneously cooling the bearing.

A still further object of the invention is to provide an improved lubricating composition including a propellant suitable for injecting a lubricant as a finely divided aerosol into a space to be lubricated, and also providing a refrigerant for cooling the space simultaneously.

Yet another object of the present invention is to provide an improved method for cooling and lubricating a bearing surface.

A still further object of the present invention is to provide a method of cooling and lubricating a bearing surface which includes the step of throttling a compressed vapor having lubricating qualities adjacent the surface, thereby to simultaneously absorb heat and film coat the surface.

The present invention provides, as one of its essential features, a lubricant composition consisting basically of a mixture of a liquified, normally gaseous propellant in combination with a lubricant which is preferably a lubricating oil.

The function of the propellant is twofold. First, it serves as a vehicle for introducing the lubricant under pressure into the area to be lubricated. While being introduced into the lubricating space, the lubricant is also broken up into very finely divided droplets, creating an aerosol dispension of the lubricant in the propellant gas.

Secondly, the characteristics of the propellant are such that it forms a very efficient means for dissipating the heat of the bearing in that it acts as a refrigerant which may be incorporated into a vapor compression refrigeration system and throttled to carry away the heat and permit the lubricating oil to appear as a film on the surface of the bearing.

Many different types of propellants can be employed for the purposes of the present invention. All that is required is that the propellant have a boiling point which is substantially below the operating temperature of the bearing and that it have the heat absorption characteristics characteristic of a good refrigerant. For the purposes of the invention, I prefer to use a halogenated hydrocarbon refrigerant material such as dichloro difluoro methane (Freon 12) in combination with a suitable lubricating oil. Alternatively, other members of the "Freon" series such as trichloro monofluoro methane (Freon 11), monochloro trifluoro methane (Freon 13), dichloro monofluoro methane (Freon 21), monochloro difluoro methane (Freon 22), and the like may also be employed. In addition to the preferred halogenated hydrocarbon type of refrigerant, I may also employ materials such as ammonia, or sulphur dioxide.

The proportions of the propellant and the lubricating oil may vary over wide ranges, depending upon the amount of heat to be dissipated and the amount of lubricant required. Generally, however, the mixtures will contain about 1 to 10% by weight of the lubricating oil in the liquified propellant.

The halogenated hydrocarbons of the type mentioned are reasonably good solvents for hydrocarbon oils, making it relatively simple to secure a homogeneous mixture of the propellant and the hydrocarbon oil. This mixture is prepared simply by lowering the temperature below the boiling point of the propellant, mixing the hydrocarbon oil with the propellant, sealing the mixture in a pressure tight bottle, and then allowing the bottle to reach room temperature slowly. Then, as pressure is released in the bottle, the propellant vaporizes very rapidly at room temperatures, carrying with it the finely divided dispersion of the hydrocarbon oil. The substantial increase in volume occasioned by the release of the pressure on the propellant serves to form a mist of the hydrocarbon oil lubricant so that as the spray leaves the nozzle, a film of the oil will become deposited upon the bearing surfaces. The released propellant gas absorbs a substantial amount of the heat of the bearing, and is vented to the atmosphere or, if desired, can be recovered in a closed system.

A further description of the present invention will be made in connection with the attached sheet of drawings which illustrates, by way of a preferred embodiment, the principles of the present invention.

In the drawing:

The single figure of the drawing illustrates somewhat schematically a lubrication system employing the principles of the present invention and used in conjunction with bearings on a turbine driven pump, portions of the assembly being shown in cross-section.

As shown in the drawing:

In the attached drawing, there is illustrated a portion of a turbine driven pump assembly 5 including a turbine impeller wheel 10 connected by fasteners 6 to a hollow shaft 11 and including a plurality of circumferentially spaced turbine blades 12 at its periphery. A working medium such as compressed air is directed through a plurality of nozzles 7 towards the blades 12 to rotatably drive the impeller wheel 10 and the shaft 11.

At the opposite end of the shaft 11 there is secured a rotor 14 of the centrifugal type having an inlet pump 8 and discharging pressured fluid into an outlet 9 formed in a pump casing 10a.

The shaft 11 is supported for rotation by a plurality of bearings carried in the pump assembly 5 including the combination thrust and radial bearings indicated generally by the reference character B. According to the principles of the present invention one or both of the bearings B are lubricated and cooled by the novel method and means herein disclosed, however, since the bearing B on the pump side of the assembly will tend to be kept sufficiently cool by natural radiation and conduction, only the bearing B adjacent the turbine end of the assembly is shown equipped with the specific cooling and lubricating means contemplated.

The bearing elements to be lubricated may, for example, be ball bearing elements including an outer race 16 and an inner race 17 between which a plurality of ball bearing elements 18 are received. Unless a closed system is employed, the ball bearing members are open to the atmosphere and are arranged so that they can be lubricated by the spray emanating from an injection means such as a nozzle 19. Flow through the nozzle 19 is governed by the operation of an electrically controlled valve 21 disposed in a conduit 22 feeding the nozzle 19.

A source of propellant and lubricating oil is provided by a gas bottle 24 in which the liquified mixture is stored. The mixture then passes through a conduit 26 and ultimately into the conduit 22.

The system shown in the drawing is arranged for periodic ejection of the lubricant into the bearing, although a continuously operating system may be employed as well. For the type of apparatus shown, there is provided a temperature sensing element 27 having a needle point 28 in contact with the outer race 16 of the ball bearing element. The temperature of the sensing element 27 is used to operate a temperature sensitive device located in a control box 29, the device being one in which changes of temperature are employed to generate an electrical voltage, or to close an electrical circuit. As examples, the temperature sensing device may be a thermocouple or a bi-metallic strip. In either case, the elements can be preset to operate at a predetermined bearing temperature to thereby operate a solenoid or similar device which opens the valve 21 at the desired temperature and thereby releases the mixture of propellant and lubricating oil into the bearing.

It will be recognized that the lubricating arrangement described in connection with the turbine driven pump assembly of the present invention utilizes the essential parts of a vapor compression refrigeration system. Thus, the nozzle 19 is in effect, an expansion valve through which the liquified refrigeration medium flows from the high pressure source, namely, the tank 24.

Since the lubricant and the refrigerant are in the form of a composition, the delivery of the medium through the nozzle 19, operative as an expansion valve, is a throttling process so that thermal energy is absorbed from the bearing assembly and the refrigerant vaporizes as in a refrigeration cycle.

It will be understood that when the system of the present invention is used with a missile, the total duration of operation may be only 15 or 25 seconds. Thus, the charge of the lubricant and refrigerant contained within the container 24 will operate to provide a coolant as well as a lubricant preventing bearing failures. With an installation requiring a longer period of operation, the component 24 of the refrigeration system would take the form of a continuous pressurizing means and the cycle could be readily closed by providing a return line from the bearing.

The operation of the device should be evident from the foregoing. As the turbine engine continues to operate, the temperature of the bearing increases substantially and may reach relatively high values. At a predetermined temperature, usually between about 200° and 250° F., the temperature sensing element 27 operates the temperature responsive device located in the control box 29 to thereby open the valve 21. The mixture of propellant and lubricating oil is then injected into the nozzle 19 which operates as an expansion valve to inject a vaporized stream of the propellant and dispersed lubricant in the form of an aerosol into the bearing. The finely divided lubricating oil particles are in a highly active form, and can readily attach themselves to the surfaces of the bearing. The substantial volumes of propellant gas released by the injection are then capable of absorbing a large amount of the heat stored in the bearing by conduction or convection. This heat is then dissipated by the release of the now heated propellant gas into the atmosphere, or if desired, to a recovery system where the gas can be cooled and recovered.

From the foregoing, it will be apparent that the present invention provides a unique but highly effective means for simultaneously lubricating and cooling bearing assemblies operating under conditions of extreme temperatures. While the invention has been disclosed and described in conjunction with a turbine driven pump assembly, it will be appreciated that the principles involved are equally applicable to other types of mechanisms where similar problems are encountered.

It will also be recognized that various modifications can be made to the described embodiment without departing from the scope of the present invention.

I claim as my invention:

In a turbine driven pump assembly having a turbine wheel, means for delivering a driving medium to said wheel, a pump having an inlet and an outlet, a pump rotor for delivering fluid from said inlet to said outlet and a shaft rigidly interconnecting said turbine wheel and said rotor for corotation and disposed between said turbine wheel and said rotor, the improvement of spaced bearings adjacent opposite ends of said shaft for journaling said shaft, and means adjacent the bearing at the turbine end of the shaft for lubricating and cooling the bearing including means providing a source of liquefied refrigerant-lubricant, means forming a valve adjacent said bearing, means comprising conduit connections between said source and said valve to carry said refrigerant-lubricant to said valve for throttling at said bearing surface, and thermostatic control means for said valve in said conduit connections including a temperature sensing element in contact with said bearing at the turbine end of the shaft responsive to a predetermined temperature increase of said bearing at the turbine end of the shaft to actuate said valve and release a supply of said refrigerant-lubricant only when said bearing is at a predetermined temperature, thereby to absorb thermal energy from the bearing while coating the same with a lubricant film.

References Cited in the file of this patent

UNITED STATES PATENTS

| | | |
|---|---|---|
| 1,191,188 | Julien | July 18, 1916 |
| 2,024,536 | Pearce | Dec. 17, 1935 |
| 2,664,173 | Karig | Dec. 29, 1953 |
| 2,709,567 | Wood | May 31, 1955 |
| 2,751,749 | Newcomb | June 26, 1956 |